(12) United States Patent
Wagner

(10) Patent No.: US 10,523,631 B1
(45) Date of Patent: Dec. 31, 2019

(54) COMMUNITIES OF INTEREST IN A CLOUD EXCHANGE

(71) Applicant: Equinix, Inc., Redwood City, CA (US)

(72) Inventor: Theodore James Wagner, Arvada, CO (US)

(73) Assignee: EQUINIX, INC., Redwood City, CA (US)

( * ) Notice: Subject to any disclaimer, the term of this patent is extended or adjusted under 35 U.S.C. 154(b) by 135 days.

(21) Appl. No.: 15/396,247

(22) Filed: Dec. 30, 2016

Related U.S. Application Data

(60) Provisional application No. 62/322,613, filed on Apr. 14, 2016.

(51) Int. Cl.
| | | |
|---|---|---|
| H04L 29/12 | (2006.01) | |
| H04L 29/08 | (2006.01) | |
| H04L 12/46 | (2006.01) | |
| H04L 12/715 | (2013.01) | |

(52) U.S. Cl.
CPC ...... *H04L 61/2567* (2013.01); *H04L 12/4641* (2013.01); *H04L 45/64* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2013/0142201 A1* | 6/2013 | Kim | ..................... | H04L 12/4645 370/392 |
| 2015/0326467 A1* | 11/2015 | Fullbright | ............... | H04L 45/04 709/242 |
| 2016/0072727 A1* | 3/2016 | Leafe | .................. | G06F 9/44526 709/226 |
| 2016/0080502 A1* | 3/2016 | Yadav | ................... | H04L 63/061 709/227 |

(Continued)

OTHER PUBLICATIONS

PDF Content from blog website : https://blog.equinix.com/blog/2014/10/09/how-equinix-differs-from-single-tenant-facilities/ (Year: 2014).*

(Continued)

*Primary Examiner* — Jeffrey M Rutkowski
*Assistant Examiner* — Basil Ma
(74) *Attorney, Agent, or Firm* — Shumaker & Sieffert, P.A.

(57) ABSTRACT

In general, techniques are described for interconnecting, within a cloud exchange, multiple entities in a community of interest by which the multiple entities can interact as peers over a private, multi-party connectivity service for direct traffic exchange. In one example, a cloud exchange includes a layer three (L3) autonomous system located within a data center, wherein the L3 autonomous system is configured: with a plurality of attachment circuits between the cloud exchange and respective networks co-located within the data center, wherein each of the networks is associated with a different customers of a cloud exchange provider for the (Continued)

cloud exchange; with an Internet Protocol Virtual Private Network (IP-VPN) for a community of interest that includes each of the plurality of customers; and to switch, using the IP-VPN and based on destination addresses of packets received from any of the networks, the packets to any other of the networks.

19 Claims, 8 Drawing Sheets

(56) References Cited

U.S. PATENT DOCUMENTS

| | | | |
|---|---|---|---|
| 2016/0088092 A1* | 3/2016 | Cardona-Gonzalez | H04L 67/141 709/227 |
| 2016/0127454 A1 | 5/2016 | Maheshwari et al. | |
| 2016/0308762 A1 | 10/2016 | Teng et al. | |

OTHER PUBLICATIONS

U.S. Appl. No. 15/344,100, by Juxiang Teng, filed Nov. 4, 2016.
U.S. Appl. No. 62/072,976, by Gagan Maheshwari, filed Oct. 30, 2014.
Rosen et al., "BGP/MPLS IP Virtual Private Networks (VPNs)," RFC 4364, Network Working Group, The Internet Society, Feb. 2006, 47 pp.

* cited by examiner

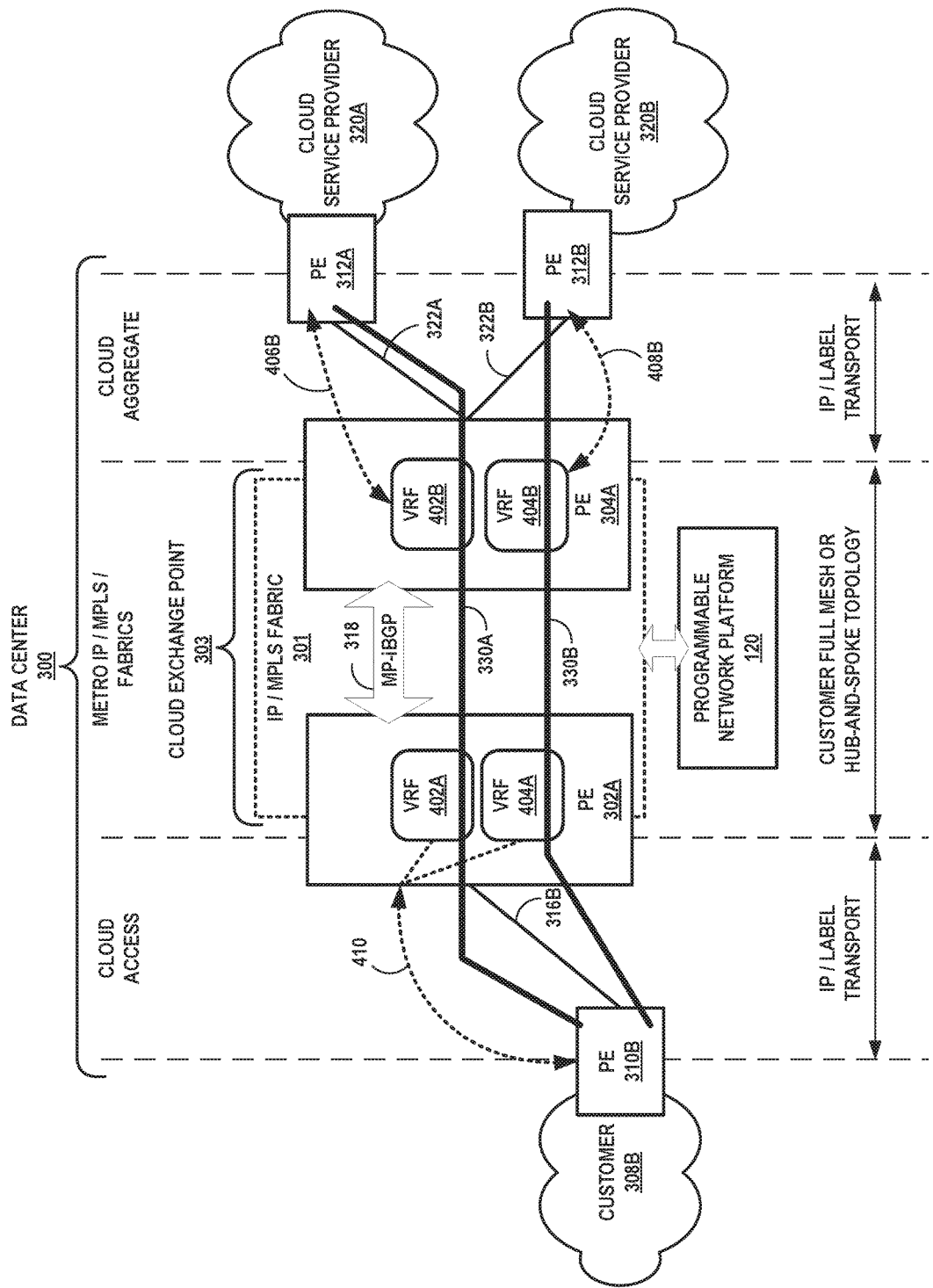

COMMUNITIES OF INTEREST IN A CLOUD EXCHANGE

This application claims the benefit of U.S. Provisional Patent Application No. 62/322,613, filed Apr. 14, 2016, the entire contents of which is incorporated by reference in in its entirety.

TECHNICAL FIELD

The invention relates to computer networks and, more specifically, to interconnections at a co-location facility.

BACKGROUND

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

SUMMARY

In general, techniques are described for interconnecting, within a cloud exchange, multiple entities in a community of interest by which the multiple entities can interact as peers over a private, multi-party connectivity service for direct traffic exchange. Participants in a community of interest network (COIN) may include any combination of cloud service providers, enterprise customers, and other entities co-located in a data center that hosts a cloud exchange offering interconnectivity among customers of a provider of the cloud exchange. Some example COINs may include financial services, healthcare services, and advertising services.

In some examples, a programmable network platform for the cloud exchange may configure one or more virtual routing and forwarding instances (VRFs) in the cloud exchange network infrastructure to establish an Internet Protocol-Virtual Private Network (IP-VPN) for exchanging routes among the various COIN participant networks and forwarding packets among the COIN participant networks attached to the IP-VPN according to the routes. The programmable network platform may offer an interface by which a COIN administrator, such as the cloud exchange provider or any of the COIN participants, may add or remove COIN participants and request that the programmable network platform configure the IP-VPN for the COIN in order to provide interconnectivity in accordance with COIN participation.

As a result, the cloud exchange may offer a full mesh of private interconnections between peers of COIN participants such that any network for a COIN participant may reach and exchange traffic with networks for any other COIN participant. In this way, the cloud exchange provider may facilitate communities of shared interest to foster small or emerging ecosystems that is scalable along with co-location by participants in the cloud exchange. A cloud exchange-based COIN may provide advantages over network service provider (NSP)-based COINs. For example, because it uses private connectivity for co-located customer networks, a cloud-exchange-based COIN may be more secure because traffic does not need to traverse a wide area network, may have lower latency due to the centralized location of the cloud exchange, and may avoid costly private connections to the NSP and through the NSP to other COIN participants that would otherwise be required for multiple peer-to-peer connections. By contrast, with a cloud exchange-based COIN, a COIN participant may with a one-time cross-connect to a port of the cloud exchange network thereafter be provided with secure shared interconnectivity to each other COIN participant.

In some examples, a method includes configuring, by a programmable network platform for a cloud exchange located within a data center, the cloud exchange with a plurality of attachment circuits between the cloud exchange and respective networks co-located within the data center, wherein each of the networks is associated with a different customer of a plurality of customers of a cloud exchange provider for the cloud exchange; configuring, by the programmable network platform, the cloud exchange with an Internet Protocol Virtual Private Network (IP-VPN) for a community of interest that includes each of the plurality of customers; and switching, by the cloud exchange using the IP-VPN and based on destination addresses of packets received from any of the networks, the packets to any other of the networks.

In some examples, a cloud exchange includes a layer three (L3) autonomous system located within a data center. The L3 autonomous system is configured with a plurality of attachment circuits between the cloud exchange and respective networks co-located within the data center, wherein each of the networks is associated with a different customer of a plurality of customers of a cloud exchange provider for the cloud exchange. The L3 autonomous system is further configured with an IP-VPN for a community of interest that includes each of the plurality of customers. The cloud exchange is configured to switch, using the IP-VPN and based on destination addresses of packets received from any of the networks, the packets to any other of the networks.

In some examples, a system includes a plurality of networks of customers co-located in a data center, a cloud exchange of the data center, and a programmable network platform. The programmable network platform is configured to configure the cloud exchange, located within the data center, with a plurality of attachment circuits between the cloud exchange and respective networks co-located within the data center, wherein each of the networks is associated with a different customer of a plurality of customers of a cloud exchange provider for the cloud exchange. The programmable network platform is further configured to configure the cloud exchange with an IP-VPN for a community of interest that includes each of the plurality of customers. The cloud exchange is configured to switch, using the IP-VPN and based on destination addresses of packets received from any of the networks, the packets to any other of the networks.

In some examples, a computing device includes one or more processors operably coupled to a memory to execute a programmable network platform. The programmable network platform is configured for execution by the one or more processors to configure a cloud exchange, located within a data center, with a plurality of attachment circuits between the cloud exchange and respective networks co-located within the data center, wherein each of the networks is associated with a different customer of a plurality of customers of a cloud exchange provider for the cloud exchange. The programmable network platform is further configured for execution to configure the cloud exchange with an IP-VPN for a community of interest that includes each of the plurality of customers. The programmable network platform is further configured for execution to switch, by the cloud exchange using the IP-VPN and based on destination addresses of packets received from any of the networks, the packets to any other of the networks.

In some examples, a computer readable storage medium includes instructions that when executed cause one or more processors to configure a cloud exchange, located within a data center, with a plurality of attachment circuits between the cloud exchange and respective networks co-located within the data center, wherein each of the networks is associated with a different customer of a plurality of customers of a cloud exchange provider for the cloud exchange. The computer readable storage medium further includes instructions that cause the one or more processors to configure the cloud exchange with an IP-VPN for a community of interest that includes each of the plurality of customers. The computer readable storage medium further includes instructions that cause the one or more processors to switch, by the cloud exchange using the IP-VPN and based on destination addresses of packets received from any of the networks, the packets to any other of the networks.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 is a block diagram illustrating an example of a data center-based cloud exchange point in which routers of the cloud exchange point are configured by programmable network platform with VPN routing and forwarding instances for routing and forwarding aggregated service traffic from multiple cloud service provider networks to a customer network, according to techniques described herein.

Like reference characters denote like elements throughout the figures and text.

DETAILED DESCRIPTION

In general, this disclosure describes interconnecting, within a cloud exchange, multiple entities in a community of interest by which the multiple entities can interact as peers over a private, multi-party connectivity service for direct traffic exchange. A "community of interest" refers to a collection of entities that have a common area of interest. In some examples, the community of interest may be based on a common area of business. Some example COINs may include financial services, healthcare services, and advertising services. In some examples, a virtual routing and forwarding ("VRF") instance within a router in a co-location facility enables a federation or community of interest network ("COIN"). The VRF allows multiple customers to connect through the COIN, rather than peer to peer, through a hub-and-spoke network, or via the public Internet. Each customer may use a single, shared routing instance to connect to any other customer in the COIN.

According to various examples described herein, a cloud exchange is described that allows customers in the COIN to connect to other customers in the COIN through the VRF. Customers in the COIN advertise prefixes and routing information to the VRF, which may transmit the prefixes and routing information to the other customers in the COIN. Customer networks may attach to the VRF configured in the cloud exchange by connecting to a port of cloud exchange network infrastructure. In some cases, the connection may be an attachment circuit (e.g., a VLAN, or L2TP connection). In some cases, the connection may include a virtual circuit. The cloud exchange thus uses a single attachment (e.g., a physical cross-connect, a virtual circuit, or an attachment circuit) to and from the shared VRF for each customer instead of separate instances for each interconnection between pairs of customers. Customers may include network carriers (or network service providers), enterprises, cloud service providers, and other buyers/sellers/transporters of cloud services offered by one or more cloud service providers.

A COIN may connect several customers that have physical presence in a co-location facility using a mesh topology, where each customer may connect with any other customer in the COIN. The COIN may use a shared routing instance for everyone in the COIN, with each customer representing a different endpoint. The COIN may be a routed environment where customers have visibility and reachability to other customers. Therefore, the cloud-based exchange COINs may have advantages of low-latency, privacy, security, ease of configuration, and cost over extranet networks, in which a virtual private network ("VPN") established by a Network Service Provider (NSP)/carrier may connect multiple, geographically-dispersed networks. Networks connected via an extranet may connect across the public Internet or through a NSP/carrier network.

Figure 1:
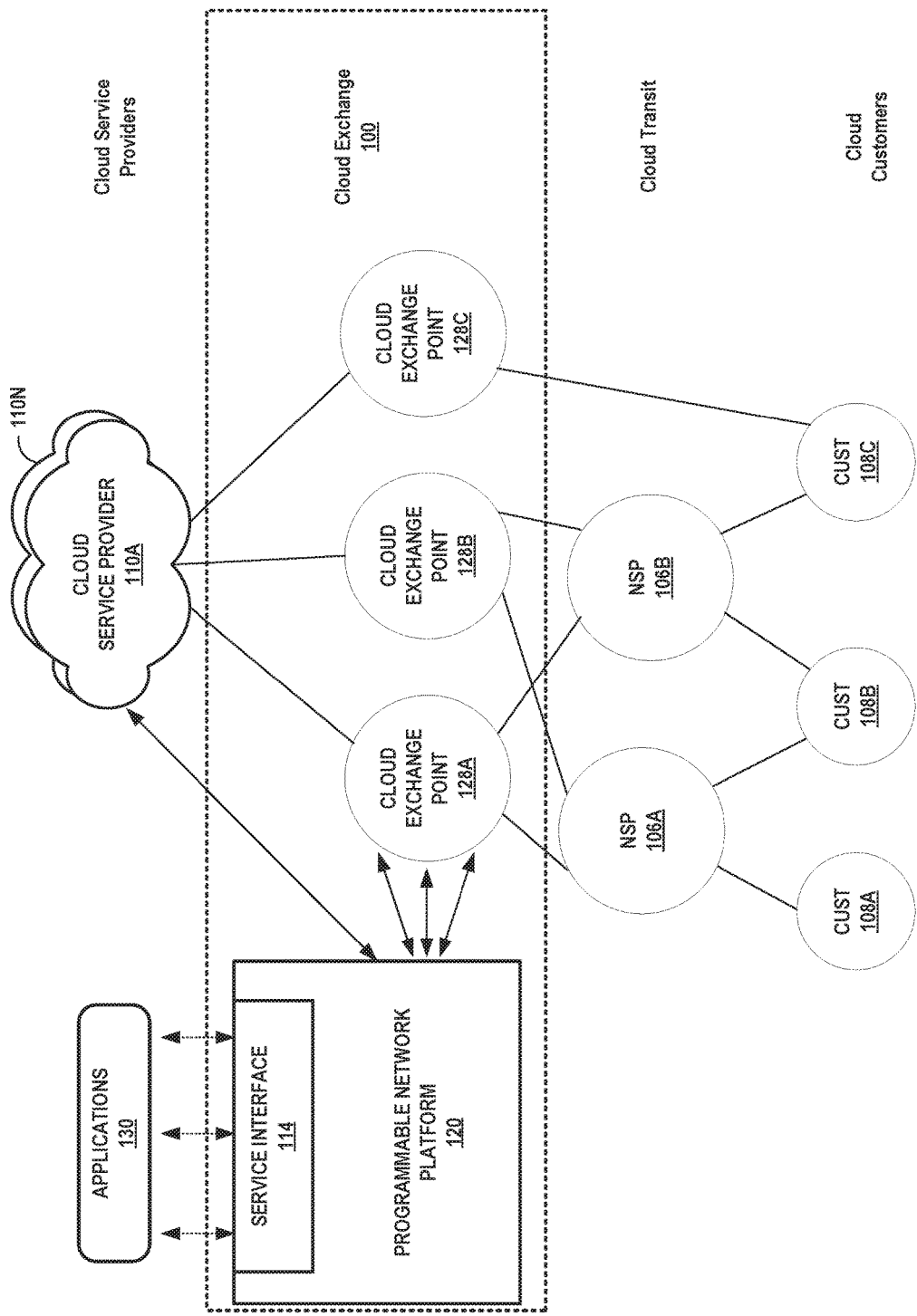
FIG. 1 is a block diagram that illustrates a high-level view of an example data center that provides an operating environment for a cloud-based services exchange.

FIG. 1 illustrates a conceptual view of an example network system 2 having a metro-based cloud exchange that provides multiple cloud exchange points according to techniques described herein. Each of cloud-based services exchange points 128A-128D (described hereinafter as "cloud exchange points" and collectively referred to as "cloud exchange points 128") of cloud-based services exchange 100 ("cloud exchange 100") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide a resilient and independent cloud-based services exchange. Cloud-based services customers ("cloud customers") and cloud-based service providers ("cloud providers") connect via cloud exchange 100 to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

Each of cloud exchange points 128 includes network infrastructure and an operating environment by which cloud customers 108A-108D (collectively, "cloud customers 108") receive cloud services from multiple cloud service providers 110A-110N (collectively, "cloud service providers 110"). Cloud customers 108 may receive cloud-based services directly via a layer 3 peering and physical connection to one of cloud exchange points 128 or indirectly via one of network service providers 106A-106B (collectively, "NSPs 106," or alternatively, "carriers 106"). NSPs 106 provide "cloud transit" by maintaining a physical presence within one or more of cloud exchange points 128 and aggregating layer 3 access from one or customers 108. NSPs 106 may peer, at layer 3, directly with one or more cloud exchange points 128 and in so doing offer indirect layer 3 connectivity and peering to one or more customers 108 by which customers 108 may obtain cloud services from the cloud exchange 100. Each of cloud exchange points 128, in the example of FIG. 1, is assigned a different autonomous system number (ASN). For example, cloud exchange point 128A is assigned ASN 1, cloud exchange point 128B is assigned ASN 2, and so forth. Each cloud exchange point 128 is thus a next hop in a path vector routing protocol (e.g., BGP) path from cloud service providers 110 to customers 108. As a result, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 128 may internalize the eBGP peering relationships that cloud service providers 110 and customers 108 would maintain on a pair-wise basis. Instead, a customer 108 may configure a single eBGP peering relationship with a cloud exchange point 128 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 108C is illustrated as having contracted with a cloud exchange provider for cloud exchange 100 to directly access layer 3 cloud services via cloud exchange points 128C. In this way, customer 108D receives redundant layer 3 connectivity to cloud service provider 110A, for instance. Customer 108C, in contrast, is illustrated as having contracted with the cloud exchange provider for cloud exchange 100 to directly access layer 3 cloud services via cloud exchange point 128C and also to have contracted with NSP 106B to access layer 3 cloud services via a transit network of the NSP 106B. Customer 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and customer 108 networks, all having at least one port offering connectivity within one or more of the cloud exchange points 128.

In some examples, cloud exchange 100 allows a corresponding one of customer customers 108A, 108B of any network service providers (NSPs) or "carriers" 106A-106B (collectively, "carriers 106") or other cloud customers including customers 108C to be directly cross-connected, via a virtual layer 2 (L2) or layer 3 (L3) connection to any other customer network and/or to any of CSPs 110, thereby allowing direct exchange of network traffic among the customer networks and CSPs 110.

Carriers 106 may each represent a network service provider that is associated with a transit network by which network subscribers of the carrier 106 may access cloud services offered by CSPs 110 via the cloud exchange 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 100.

In this way, cloud exchange 100 streamlines and simplifies the process of partnering CSPs 110 and customers (via carriers 106 or directly) in a transparent and neutral manner. One example application of cloud exchange 100 is a co-location and interconnection data center in which CSPs 110 and carriers 106 and/or customers 108 may already have network presence, such as by having one or more accessible ports available for interconnection within the data center, which may represent any of cloud exchange points 128. This allows the participating carriers, customers, and CSPs to have a wide range of interconnectivity options within the same facility. A carrier/customer may in this way have options to create many-to-many interconnections with only a one-time hook up to one or more cloud exchange points 128. In other words, instead of having to establish separate connections across transit networks to access different cloud service providers or different cloud services of one or more cloud service providers, cloud exchange 100 allows customers to interconnect to multiple CSPs and cloud services.

In accordance with techniques described herein, cloud exchange 100 includes a programmable network platform 120 for dynamically programming cloud exchange 100 to responsively and assuredly fulfill service requests that encapsulate business requirements for services provided by cloud exchange 100 and/or cloud service providers 110 coupled to the cloud exchange 100. The programmable network platform 120 as described herein may, as a result, orchestrate a business-level service across heterogeneous cloud service providers 110 according to well-defined service policies, quality of service policies, service level agreements, and costs, and further according to a service topology for the business-level service.

The programmable network platform 120 enables the cloud exchange provider that administers the cloud exchange 100 to dynamically configure and manage the cloud exchange 100 to, for instance, facilitate virtual connections for cloud-based services delivery from multiple cloud service providers 110 to one or more cloud customers 108. The cloud exchange 100 may enable cloud customers 108 to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

Programmable network platform 120 may represent an application executing within one or more data centers of the cloud exchange 100 or alternatively, off-site at a back office or branch of the cloud provider (for instance). Programmable network platform 120 may be distributed in whole or in part among the data centers, each data center associated with a different cloud exchange point 128 to make up the cloud exchange 100. Although shown as administering a single cloud exchange 100, programmable network platform 120 may control service provisioning for multiple different cloud exchanges. Alternatively or additionally, multiple separate instances of the programmable network platform 120 may control service provisioning for respective multiple different cloud exchanges.

In the illustrated example, programmable network platform 120 includes a service interface (or "service API") 114 that defines the methods, fields, and/or other software primitives by which applications may invoke the programmable network platform 120. The service interface 114 may allow carriers 106, customers 108, cloud service providers 110, and/or the cloud exchange provider programmable access to capabilities and assets of the cloud exchange 100.

For example and as further described herein, the service interface 114 may facilitate machine-to-machine communication to enable dynamic provisioning of virtual circuits in the cloud exchange for interconnecting customer and cloud service provider networks. In this way, the programmable network platform 120 enables the automation of aspects of cloud services provisioning. For example, the service interface 114 may provide an automated and seamless way for customers to establish, de-install and manage interconnection with multiple, different cloud providers participating in the cloud exchange.

Further example details of a cloud-based services exchange can be found in U.S. Provisional Patent Application 62/149,374, filed Apr. 17, 2015 and entitled "Cloud-Based Services Exchange;" and in U.S. Provisional Patent Application 62/072,976, filed Oct. 30, 2014 and entitled "INTERCONNECTION PLATFORM FOR REAL-TIME CONFIGURATION AND MANAGEMENT OF A CLOUD-BASED SERVICES EXCHANGE;" each of which are incorporated herein by reference in their respective entireties.

Figure 2:
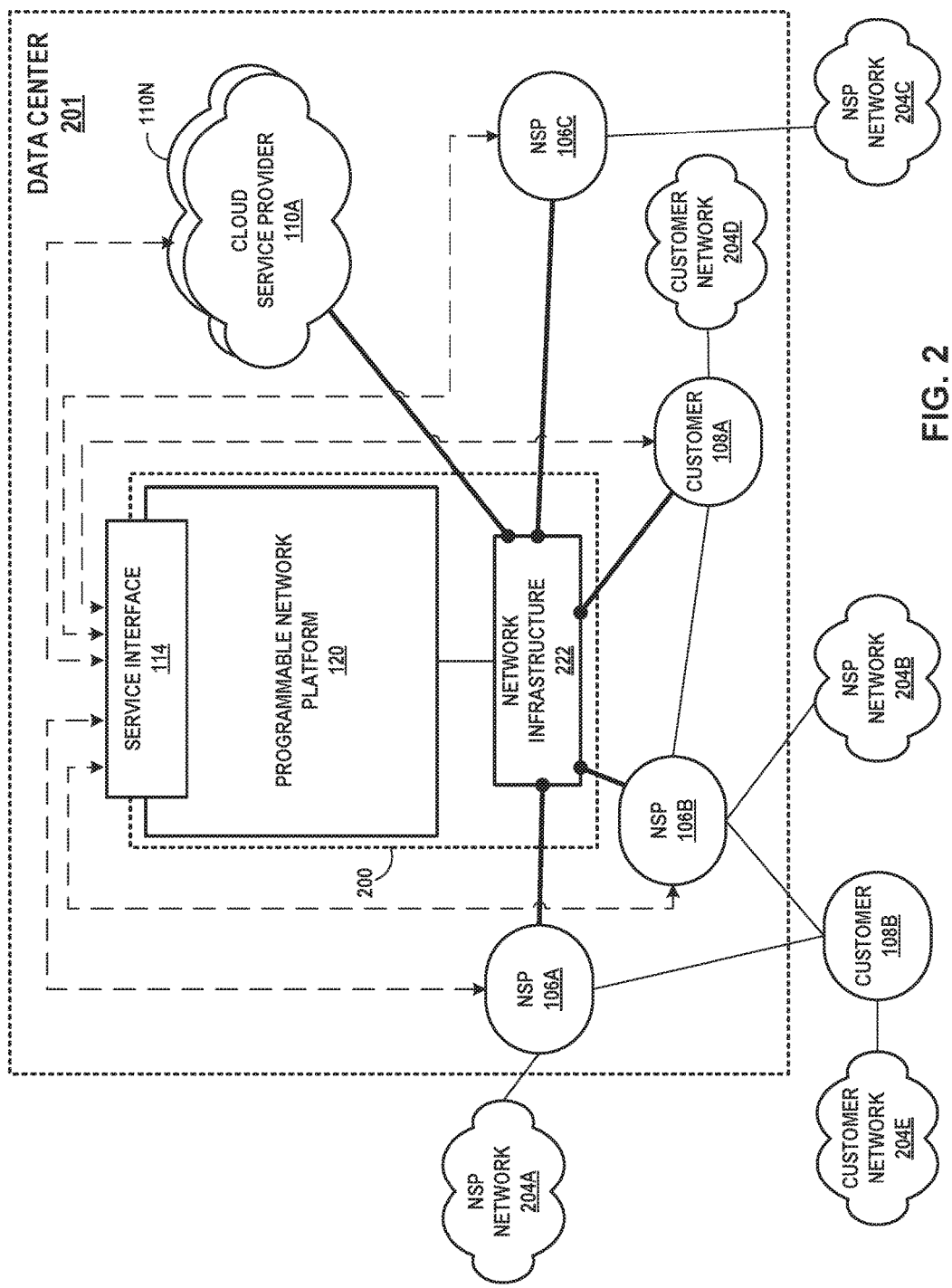
FIG. 2 is a block diagram illustrating a high-level view of an example data center that provides an operating environment for a cloud-based services exchange, according to techniques described herein.

FIG. 2 is a block diagram illustrating a high-level view of an example data center 201 that provides an operating environment for a cloud-based services exchange 200, according to techniques described herein. Cloud-based services exchange 200 ("cloud exchange 200") allows a corresponding one of customer networks 204D, 204E and NSP networks 204A-204C (collectively, "'private' or 'carrier' networks 204") of any NSPs 106A-106C or other cloud customers including customers 108A, 108B to be directly cross-connected, via a layer 3 (L3) or layer 2 (L2) connection to any other customer network and/or to any of cloud service providers 110A-110N, thereby allowing exchange of cloud service traffic among the customer networks and CSPs 110. Data center 201 may be entirely located within a centralized area, such as a warehouse or localized data center complex, and provide power, cabling, security, and other services to NSPs, customers, and cloud service providers that locate their respective networks within the data center 201 (e.g., for co-location) and/or connect to the data center 201 by one or more external links.

Network service providers 106 may each represent a network service provider that is associated with a transit network by which network subscribers of the NSP 106 may access cloud services offered by CSPs 110 via the cloud exchange 200. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 200.

In this way, cloud exchange 200 streamlines and simplifies the process of partnering CSPs 110 and customers 108 (indirectly via NSPs 106 or directly) in a transparent and neutral manner. One example application of cloud exchange 200 is a co-location and interconnection data center in which CSPs 110, NSPs 106 and/or customers 108 may already have network presence, such as by having one or more accessible ports available for interconnection within the data center. This allows the participating carriers, customers, and CSPs to have a wide range of interconnectivity options in the same facility. Cloud exchange 200 of data center 201 includes network infrastructure 222 that provides a L2/L3 switching fabric by which CSPs 110 and customers/NSPs interconnect. This enables an NSP/customer to have options to create many-to-many interconnections with only a one-time hook up to the switching network and underlying network infrastructure 222 that presents an programmable network platform 120 for cloud exchange 200. In other words, instead of having to establish separate connections across transit networks to access different cloud service providers or different cloud services of one or more cloud service providers, cloud exchange 200 allows customers to interconnect to multiple CSPs and cloud services using network infrastructure 222 within data center 201, which may represent any of the edge networks described in this disclosure, at least in part.

By being connected to and utilizing cloud exchange 200, customers can purchase services and reach out to many end users in many different geographical areas without incurring the same expenses typically associated with installing and maintaining multiple virtual connections with multiple CSPs 110. For example, NSP 106A can expand its services using network 204B of NSP 106B. By connecting to cloud exchange 200, a NSP 106 may be able to generate additional revenue by offering to sell its network services to the other carriers. For example, NSP 106C can offer the opportunity to use NSP network 204C to the other NSPs.

Cloud exchange 200 includes an programmable network platform 120 that exposes at least one service interfaces, which may include in some examples and are alternatively referred to herein as application programming interfaces (APIs) in that the APIs define the methods, fields, and/or other software primitives by which applications may invoke the programmable network platform 120. The software interfaces allow NSPs 206 and customers 108 programmable access to capabilities and assets of the cloud exchange 200. The programmable network platform 120 may alternatively be referred to as a controller, provisioning platform, provisioning system, service orchestration system, etc., for establishing end-to-end services including, e.g., connectivity between customers and cloud service providers according to techniques described herein.

On the buyer side, the software interfaces presented by the underlying interconnect platform provide an extensible framework that allows software developers associated with the customers of cloud exchange 200 (e.g., customers 108 and NSPs 206) to create software applications that allow and leverage access to the programmable network platform 120 by which the applications may request that the cloud exchange 200 establish connectivity between the customer and cloud services offered by any of the CSPs 110. For example, these buyer-side software interfaces may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services, including dynamic selection of bandwidth based on a purchased cloud service to create on-demand and need based virtual circuits to cloud service providers, delete virtual circuits, obtain active virtual circuit information, obtain details surrounding CSPs partnered with the cloud exchange provider, obtain customized analytics data, validate partner access to interconnection assets, and assure service delivery.

On the cloud service provider (seller) side, the software interfaces may allow software developers associated with cloud providers to manage their cloud services and to enable customers to connect to their cloud services. For example, these seller-side software interfaces may allow cloud service provider applications to obtain authorization to access the cloud exchange, obtain information regarding available cloud services, obtain active ports and metro area details for the provider, obtain active port details in a given data center for the provider, approve or reject virtual circuits of varying bandwidth created by customers for the purpose of accessing cloud services, obtain virtual circuits pending addition and confirm addition of virtual circuits, obtain virtual circuits pending deletion and confirm deletion of virtual circuits, obtain customized analytics data, validate partner access to interconnection assets, and assure service delivery.

As further described herein, the service interface 114 facilitates machine-to-machine communication to enable dynamic service provisioning and service delivery assurance. In this way, the programmable network platform 120 enables the automation of aspects of cloud services provisioning. For example, the software interfaces may provide an automated and seamless way for customers to establish, de-install and manage interconnection with multiple, different cloud providers participating in the cloud exchange. The programmable network platform 120 may in various examples execute on one or virtual machines and/or real servers of data center 201, or off-site.

In the example of FIG. 2, network infrastructure 222 represents the cloud exchange switching fabric and includes multiple ports that may be dynamically interconnected with virtual circuits by, e.g., invoking service interface 114 of the programmable network platform 120. Each of the ports is associated with one of carriers 106, customers 108, and CSPs 110.

Figure 3A:
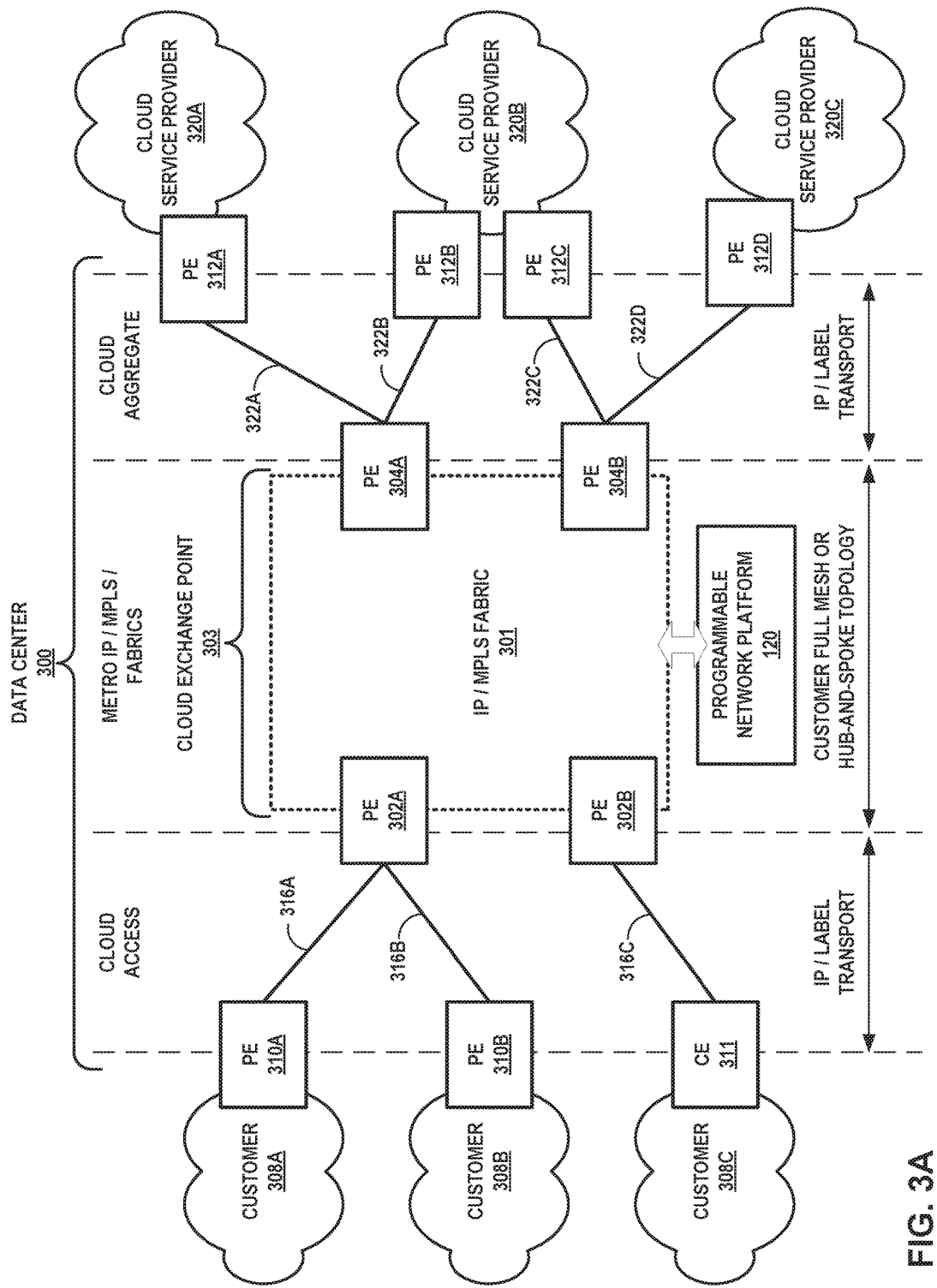
FIGS. 3A-3B are block diagrams illustrating example network infrastructure and service provisioning by a programmable network platform for a cloud exchange that aggregates the cloud services of multiple cloud service providers for provisioning to customers of the cloud exchange provider and aggregates access for multiple customers to one or more cloud service providers, in accordance with techniques described in this disclosure.
Figure 3B:
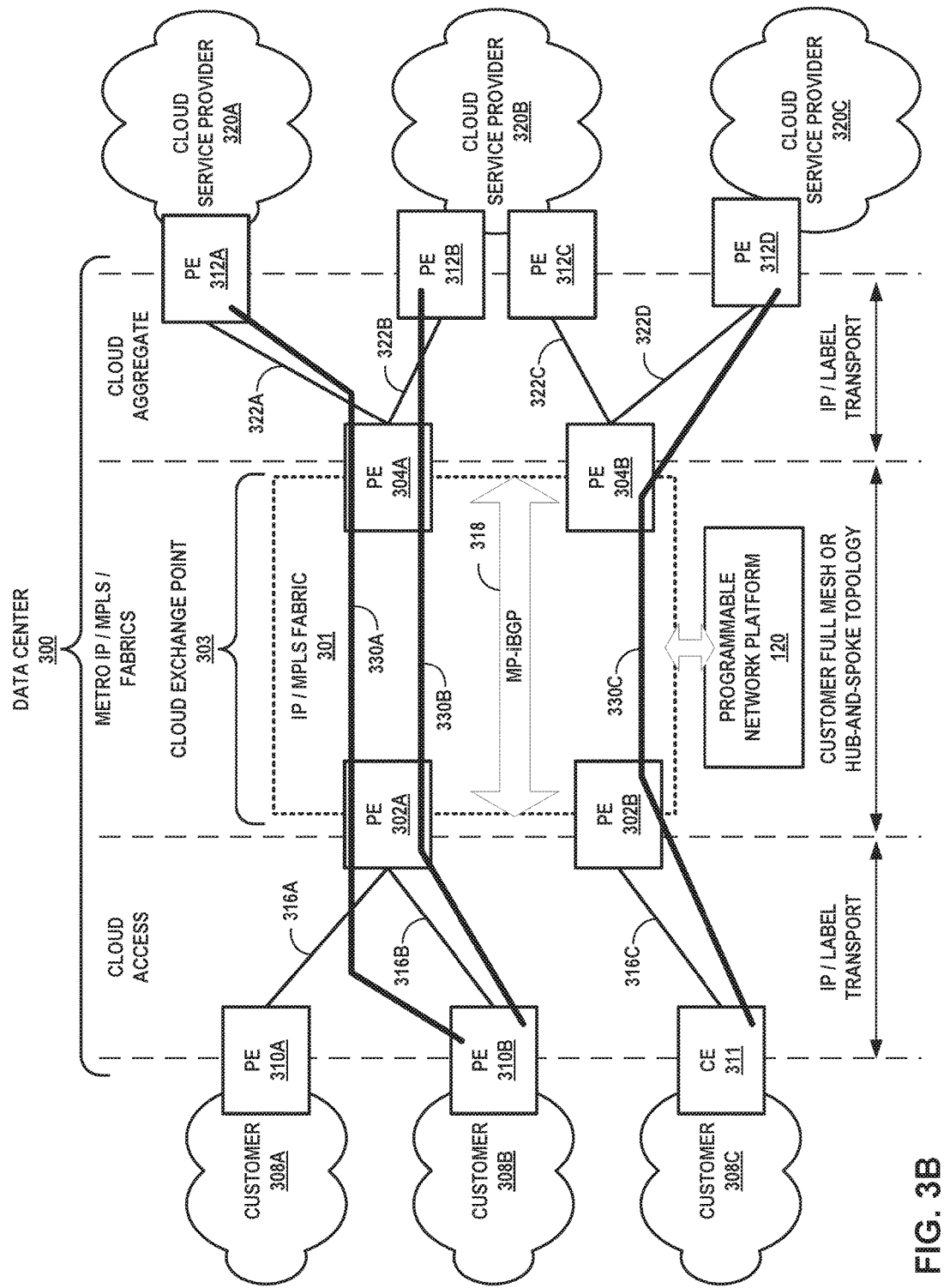

FIGS. 3A-3B are block diagrams illustrating example network infrastructure and service provisioning by a programmable network platform for a cloud exchange that aggregates the cloud services of multiple cloud service providers for provisioning to customers of the cloud exchange provider and aggregates access for multiple customers to one or more cloud service providers, in accordance with techniques described in this disclosure. In this example, customer networks 308A-308C (collectively, "customer networks 308"), each associated with a different customer, access a cloud exchange point within a data center 300 in order receive aggregated cloud services from one or more cloud service provider networks 320, each associated with a different cloud service provider 110. Customer networks 308 each include endpoint devices that consume cloud services provided by cloud service provider network 320. Example endpoint devices include servers, smart phones, television set-top boxes, workstations, laptop/tablet computers, video gaming systems, teleconferencing systems, media players, and so forth.

Customer networks 308A-308B include respective provider edge/autonomous system border routers (PE/ASBRs) 310A-310B. Each of PE/ASBRs 310A, 310B may execute exterior gateway routing protocols to peer with one of PE routers 302A-302B ("PE routers 302" or more simply "PEs 302") over one of access links 316A-316B (collectively, "access links 316"). In the illustrated examples, each of access links 316 represents a transit link between an edge router of a customer network 308 and an edge router (or autonomous system border router) of cloud exchange point 303. For example, PE 310A and PE 302A may directly peer via an exterior gateway protocol, e.g., exterior BGP, to exchange L3 routes over access link 316A and to exchange L3 data traffic between customer network 308A and cloud service provider networks 320. Access links 316 may in some cases represent and alternatively be referred to as attachment circuits for IP-VPNs configured in IP/MPLS fabric 301, as described in further detail below. Access links 316 may in some cases each include a direct physical connection between at least one port of a customer network 308 and at least one port of cloud exchange point 303, with no intervening transit network. Access links 316 may operate over a VLAN or a stacked VLAN (e.g., QinQ), a VxLAN, an LSP, a GRE tunnel, or other type of tunnel.

While illustrated and primarily described with respect to L3 connectivity, PE routers 302 may additionally offer, via access links 316, L2 connectivity between customer networks 308 and cloud service provider networks 320. For example, a port of PE router 302A may be configured with an L2 interface that provides, to customer network 308A, L2 connectivity to cloud service provider 320A via access link 316A, with the cloud service provider 320A router 312A coupled to a port of PE router 304A that is also configured with an L2 interface. The port of PE router 302A may be additionally configured with an L3 interface that provides, to customer network 308A, L3 connectivity to cloud service provider 320B via access links 316A. PE 302A may be configured with multiple L2 and/or L3 sub-interfaces such that customer 308A may be provided, by the cloud exchange provider, with a one-to-many connection to multiple cloud service providers 320.

To create an L2 interconnection between a customer network 308 and a cloud service provider network 320, in some examples, IP/MPLS fabric 301 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a CSP-facing port of cloud service providers 320. In some cases, a cloud service provider 320 and customer 308 may have access links to the same PE router 302, 304, which bridges the L2 traffic using the bridge domain.

To create an L3 interconnection between a customer network 308 and a cloud service provider network 320, in some examples, IP/MPLS fabric 301 is configured with a L3 virtual routing and forwarding instances (VRFs), as described in further detail below with respect to FIG. 4.

Each of access links 316 and aggregation links 322 may include a network interface device (NID) that connects customer network 308 or cloud service provider 328 to a network link between the NID and one of PE routers 302, 304. Each of access links 316 and aggregation links 322 may represent or include any of a number of different types of links that provide L2 and/or L3 connectivity.

In this example, customer network 308C is not an autonomous system having an autonomous system number. Customer network 308C may represent an enterprise, network service provider, or other customer network that is within the routing footprint of the cloud exchange point. Customer network includes a customer edge (CE) device 311 that may execute exterior gateway routing protocols to peer with PE router 302B over access link 316C. In various examples, any of PEs 310A-310B may alternatively be or otherwise represent CE devices.

Access links 316 include physical links. PE/ASBRs 310A-310B, CE device 311, and PE routers 302A-302B exchange L2/L3 packets via access links 316. In this respect, access links 316 constitute transport links for cloud access via cloud exchange point 303. Cloud exchange point 303 may represent an example of any of cloud exchange points 128. Data center 300 may represent an example of data center 201.

Cloud exchange point 303, in some examples, aggregates customers 308 access to the cloud exchange point 303 and thence to any one or more cloud service providers 320. FIGS. 3A-3B, e.g., illustrate access links 316A-316B connecting respective customer networks 308A-308B to PE router 302A of cloud exchange point 303 and access link 316C connecting customer network 308C to PE router 302B. Any one or more of PE routers 302, 304 may comprise ASBRs. PE routers 302, 304 and IP/MPLS fabric 301 may be configured according to techniques described herein to interconnect any of access links 316 to any of cloud aggregation links 322. As a result, cloud service provider network 320A, e.g., needs only to have configured a single cloud aggregate link (here, access link 322A) in order to provide services to multiple customer networks 308. That is, the cloud service provider operating cloud service provider network 302A does not need to provision and configure separate service links from cloud service provider network 302A to each of PE routers 310, 311, for instance, in order to provide services to each of customer network 308. Cloud exchange point 303 may instead cross-connect cloud aggregation link 322A and PE 312A of cloud service provider network 320A to multiple cloud access links 316 to provide layer 3 peering and network reachability for the cloud services delivery.

In addition, a single customer network, e.g., customer network 308A, need only to have configured a single cloud access link (here, access link 316A) to the cloud exchange point 303 within data center 300 in order to obtain services from multiple cloud service provider networks 320 offering cloud services via the cloud exchange point 303. That is, the customer or network service provider operating customer network 308A does not need to provision and configure separate service links connecting customer network 308A to different PE routers 312, for instance, in order to obtain services from multiple cloud service provider networks 320. Cloud exchange point 303 may instead cross-connect cloud access link 316A (again, as one example) to multiple cloud aggregate links 322 to provide layer 3 peering and network reachability for the cloud services delivery to customer network 308A.

Cloud service provider networks 320 each includes servers configured to provide one or more cloud services to users. These services may be categorized according to service types, which may include for examples, applications/software, platforms, infrastructure, virtualization, and servers and data storage. Example cloud services may include content/media delivery, cloud-based storage, cloud computing, online gaming, IT services, etc.

Cloud service provider networks 320 include PE routers 312A-312D that each executes an exterior gateway routing protocol, e.g., eBGP, to exchange routes with PE routers 304A-304B (collectively, "PE routers 304") of cloud exchange point 303. Each of cloud service provider networks 320 may represent a public, private, or hybrid cloud. Each of cloud service provider networks 320 may have an assigned autonomous system number or be part of the autonomous system footprint of cloud exchange point 303.

In the illustrated example, an Internet Protocol/Multiprotocol label switching (IP/MPLS) fabric 301 interconnects PEs 302 and PEs 304. IP/MPLS fabric 301 include one or more switching and routing devices, including PEs 302, 304, that provide IP/MPLS switching and routing of IP packets to form an IP backbone. In some example, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 with multiple cloud service provider networks 320 to provide a data center-based 'transport' and layer 3 cross-connect. Whereas service provider-based IP backbone networks require wide-area network (WAN) connections with limited bandwidth to transport service traffic from layer 3 services providers to customers, the cloud exchange point 303 as described herein 'transports' service traffic and cross-connects cloud service providers 320 to customers 308 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein (hereinafter, "RFC 4364"). In some example configurations, a customer network 308 and cloud service provider network 320 may connect via respective links to the same PE router of IP/MPLS fabric 301.

Access links 316 and aggregation links 322 may include attachment circuits that associate traffic, exchanged with the connected customer network 308 or cloud service provider network 320, with virtual routing and forwarding instances (VRFs) configured in PEs 302, 304 and corresponding to IP-VPNs operating over IP/MPLS fabric 301. For example, PE 302A may exchange IP packets with PE 310A on a bidirectional label-switched path (LSP) operating over access link 316A, the LSP being an attachment circuit for a VRF configured in PE 302A. As another example, PE 304A may exchange IP packets with PE 312A on a bidirectional label-switched path (LSP) operating over access link 322A, the LSP being an attachment circuit for a VRF configured in PE 304A. Each VRF may include or represent a different routing and forwarding table with distinct routes.

PE routers 302, 304 of IP/MPLS fabric 301 may be configured in respective hub-and-spoke arrangements for cloud services, with PEs 304 implementing cloud service hubs and PEs 302 being configured as spokes of the hubs (for various hub-and-spoke instances/arrangements). A hub-and-spoke arrangement ensures that service traffic is enabled to flow between a hub PE and any of the spoke PEs, but not directly between different spoke PEs. As described further below, in a hub-and-spoke arrangement for data center-based IP/MPLS fabric 301 and for southbound service traffic (i.e., from a CSP to a customer) PEs 302 advertise routes, received from PEs 310, to PEs 304, which advertise the routes to PEs 312. For northbound service traffic (i.e., from a customer to a CSP), PEs 304 advertise routes, received from PEs 312, to PEs 302, which advertise the routes to PEs 310.

For some customers of cloud exchange point 303, the cloud exchange point 303 provider may configure a full mesh arrangement whereby a set of PEs 302, 304 each couple to a different customer site network for the customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

PE routers may couple to one another according to a peer model without use of overlay networks. That is, PEs 310 and PEs 312 may not peer directly with one another to exchange routes, but rather indirectly exchange routes via IP/MPLS fabric 301. In the example of FIG. 3B, cloud exchange point 303 is configured to implement multiple layer 3 virtual circuits 330A-330C (collectively, "virtual circuits 330") to interconnect customer network 308 and cloud service provider networks 322 with end-to-end IP paths. Each of cloud service providers 320 and customers 308 may be an endpoint for multiple virtual circuits 330, with multiple virtual circuits 330 traversing one or more attachment circuits between a PE/PE or PE/CE pair for the IP/MPLS fabric 301 and the CSP/customer. A virtual circuit 330 represents a layer 3 path through IP/MPLS fabric 301 between an attachment circuit connecting a customer network to the fabric 301 and an attachment circuit connecting a cloud service provider network to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, PE router 312A of cloud service provider network 320A may send a route for cloud service provider network 320A to PE 304A via a routing protocol (e.g., eBGP) peering connection with PE 304A. PE 304A associates the route with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 310B via a routing protocol connection with PE 310B. PE router 302A may send the route after adding an autonomous system number of the cloud exchange point 303 (e.g., to a BGP autonomous system path (AS_PATH) attribute) and specifying PE router 302A as the next hop router. Cloud exchange point 303 is thus an autonomous system "hop" in the path of the autonomous systems from customers 308 to cloud service providers 320 (and vice-versa), even though the cloud exchange point 303 may be based within a data center. PE router 310B installs the route to a routing database, such as a BGP routing information base (RIB) to provide layer 3 reachability to cloud service provider network 320A. In this way, cloud exchange point 303 "leaks" routes from cloud service provider networks 320 to customer networks 308, without cloud service provider networks 320 to customer networks 308 requiring a direct layer peering connection.

PE routers 310B, 302A, 304A, and 312A may perform a similar operation in the reverse direction to forward routes originated by customer network 308B to PE 312A and thus provide connectivity from cloud service provider network 320A to customer network 308B. In the example of virtual circuit 330B, PE routers 312B, 304A, 302A, and 310B exchange routes for customer network 308B and cloud service provider 320B in a manner similar to that described above for establishing virtual circuit 330B. As a result, cloud exchange point 303 within data center 300 internalizes the peering connections that would otherwise be established between PE 310B and each of PEs 312A, 312B so as to perform cloud aggregation for multiple layer 3 cloud services provided by different cloud service provider networks 320A, 320B and deliver the multiple, aggregated layer 3 cloud services to a customer network 308B having a single access link 316B to the cloud exchange point 303. Absent the techniques described herein, fully interconnecting customer networks 308 and cloud service provider networks 320 would require 3×3 peering connections between each of PEs 310 and at least one of PEs 312 for each of cloud service provider networks 320. For instance, PE 310A would require a layer 3 peering connection with each of PEs 312. With the techniques described herein, cloud exchange point 303 may fully interconnect customer networks 308 and cloud service provider networks 320 with one peering connection per site PE (i.e., for each of PEs 310 and PEs 312) by internalizing the layer 3 peering and providing data center-based 'transport' between cloud access and cloud aggregate interfaces.

In examples in which IP/MPLS fabric 301 implements BGP/MPLS IP VPNs or other IP-VPNs that use route targets to control route distribution within the IP backbone, PEs 304 may be configured to import routes from PEs 302 and to export routes received from PEs 312, using different asymmetric route targets. Likewise, PEs 302 may be configured to import routes from PEs 304 and to export routes received from PEs 310 using the asymmetric route targets. Thus, PEs 302, 304 may configured to implement advanced L3VPNs that each includes a basic backbone L3VPN of IP/MPLS fabric 301 together with extranets of any of customer networks 308 and any of cloud service provider networks 320 attached to the basic backbone L3VPN. Each advanced L3VPN constitutes a cloud service delivery network from a cloud service provider network 320 to one or more customer networks 308, and vice-versa. In this way, cloud exchange point 303 enables any cloud service provider network 320 to exchange cloud service traffic with any customer network 308 while internalizing the layer 3 routing protocol peering connections that would otherwise be established between pairs of customer networks 308 and cloud service provider networks 320 for any cloud service connection between a given pair. In other words, the cloud exchange point 303 allows each of customer networks 308 and cloud service provider networks 320 to establish a single (or more for redundancy or other reasons) layer 3 routing protocol peering connection to the data center-based layer 3 cross-connect. By filtering routes from cloud service provider networks 320 to customer networks 308, and vice-versa, PEs 302, 304 thereby control the establishment of virtual circuits 330 and the flow of associated cloud service traffic between customer networks 308 and cloud service provider networks 320 within a data center 300. Routes distributed into MP-iBGP mesh 318 may be VPN-IPv4 routes and be associated with route distinguishers to distinguish routes from different sites having overlapping address spaces.

Programmable network platform 120 may receive service requests for creating, reading, updating, and/or deleting end-to-end services of the cloud exchange point 303. In response, programmable network platform 120 may configure PEs 302, 304 and/or other network infrastructure of IP/MPLS fabric 301 to provision or obtain performance or other operations information regarding the service. Operations for provisioning a service and performed by programmable network platform 120 may include configuring or updating VRFs, installing SDN forwarding information, configuring LSPs or other tunnels, configuring BGP, configuring access links 316 and aggregation links 322, or otherwise modifying the configuration of the IP/MPLS fabric 301. Other operations may include making service requests to an orchestration system for cloud service provider networks 320, as described in further detail below.

FIG. 4 is a block diagram illustrating an example of a data center-based cloud exchange point in which routers of the cloud exchange point are configured by programmable network platform 120 with VPN routing and forwarding instances for routing and forwarding aggregated service traffic from multiple cloud service provider networks to a customer network, according to techniques described herein. In this example, to establish virtual circuits 330A-330B, PE routers 302A and 304A of IP/MPLS fabric 301 are configured with VRFs. PE 302A is configured with VRFs 402A and 404A, while PE 304A is configured with VRFs 402B and 404B. VRF 402A is configured to import routes exported by VRF 402B, and VRF 402B is configured to import routes exported by VRF 402A. The configuration may include asymmetric route targets for import/export between VRFs 402A, 402B. VRF 404A is configured to import routes exported by VRF 402B, and VRF 402B is configured to import routes exported by VRF 402A. The configuration may include asymmetric route targets for import/export between VRFs 402A, 402B. This configuration whereby a customer is able to access multiple layer 3 services from different CSPs each associated with separate VRFs to access the layer 3 services provides isolation of respective traffic exchanged with the CSPs. In some examples, PE 302A may be configured with a single VRF to import routes exported by both VRF 402B and VRF 404B. As noted above with respect to FIGS. 3A-3B, PEs 302, 304 may be further configured to bridge layer 2 traffic between customer 308B and cloud service providers 320.

In this example, PE 304A operates BGP or other route distribution protocol peering connections 406B, 408B with respective PEs 312A, 312B to exchange routes with respective cloud service provider networks 320A, 320B. PE 302A operates a BGP or other route distribution protocol peering connection 410 with PE 310B to exchange routes with customer network 308B. In some examples, PEs 302A, 304A may be statically configured with routes for the site networks.

An administrator or a programmable network platform described herein for cloud exchange point 303 may configure PEs 302A, 304A with the VRF 402A-402B, 404A-404B in order to leak routes between PEs 312 and PE 310B and facilitate layer 3 connectivity for end-to-end IP paths illustrated here by virtual circuits 330, while potentially optimizing the end-to-end IP paths by fostering data center-based or at least metro-based connectivity. Cloud exchange point 303 may thus provide dedicated cloud service provider access to customer network 308B by way of private and/or public routes for the cloud service provider networks 320. In the northbound direction, cloud exchange point 303 may provide dedicated cloud service provider distribution to multiple customer networks 308 by way of private and/or public routes for the customer networks 308. Neither PE 310B nor any of PEs 302A, 304A need access to the full Internet BGP routing table in order to reach cloud service provider networks 320 or customer networks 308. Moreover, PEs 302A, 304A may be configured to aggregate customer/CSP routes and/or service traffic based on any one or more of physical, IP, service, and VRFs.

Figure 5:
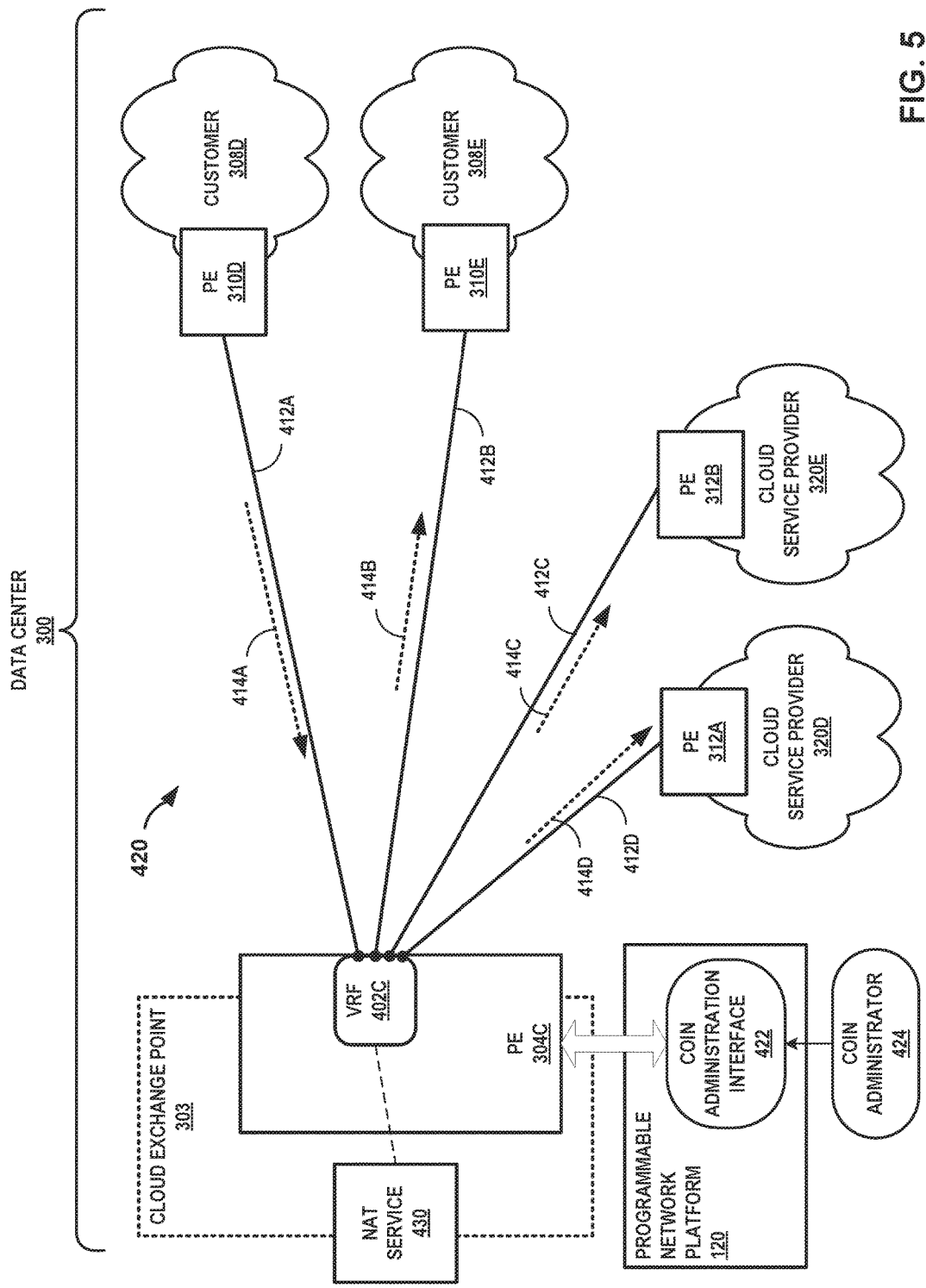
FIG. 5 is a block diagram illustrating an example community of interest network, including two or more customers of a cloud exchange provider, according to techniques described herein.

FIG. 5 is a block diagram illustrating an example community of interest network 420 ("COIN 420") including two or more customers of a cloud exchange provider, according to techniques described herein. The COIN 420 may include provider edge router 304C, enterprise customers 308D-308E, and CSPs 320D-320E, each of which may be co-located in data center 300. Customers 308 and CSPs 320 may all be referred to as participants with respect to COIN 420. The COIN 420 participants may interconnect through VRF 402C via a single virtual circuit 412A-412D ("virtual circuits 412") for each customer. Each of virtual circuits 412 may include an attachment circuit configured on a port for PE 304C and a port for corresponding PEs 310, 312. VRF 402C may be configured to switch cloud service traffic among customer networks 308, CSP network 320 using the virtual circuits 412. In effect, each of the customer networks 308, CSP network 320 has a virtual circuit to each other without having to purchase or be configured with a dedicated pair-wise virtual circuit for each pair of COIN participants. Each of virtual circuits 412 may represent an attachment circuit for a VRF.

That is, instead of a direct interconnection between each set of customers, COIN 420 may allow each of customers 308 and CSPs 320 to exchange routes and cloud service traffic with one another by establishing a single virtual connection 412 with VRF 402C. Each customer may request a respective virtual circuit 412 with VRF 402C and provide routing information 414 to VRF 402C in order to access the COIN 420. The customer can create the virtual circuit over a cross-connect between the customer's PE (or CE) router and a PE router 304C within cloud exchange point 303. VRF 402C may, in turn, provide the routing information 414 to all of the other customers within COIN 420. As shown in FIG. 5, customer 308D joins COIN 420 and transmits routing information 414A to VRF 402C. VRF 402C may then re-transmit routing information 414B-414D to customer 308E and CSPs 320D-320E. With the routing information 414, other customers may connect with customer 308D and exchange data.

Routing information 414 may represent customer routes for the corresponding participant networks, exchanged by PEs peered to one another in a BGP peering session. VRF 402C may store customer routes as VPN routes for the IP-VPN implemented at least in part by VRF 402C, in order to distinguish overlapping customer addresses, according to RFC 4364. While illustrated as implemented by a single VRF 402C configured for PE 304C, multiple cloud exchange PEs 304 may be configured with respective VRFs 402 in a full-mesh topology to implement an IP-VPN for COIN 420. PEs 304 configured in this way may exchange VPN routes for COIN participants using iBGP, as described above with respect to FIGS. 1-4. Each VPN route may include a route distinguisher.

Customers of the cloud exchange seeking to join COIN 420 can purchase a port to the COIN 420 to become members of COIN 420. The COIN 420 has a shared routing instance, and all the members are endpoints of the shared routing instance. This allows access by all members in the routing instance to every other member of the routing instance. In this way, members of COIN 420 can share data amongst themselves via the private COIN 420, without having to send the data over a public WAN such as the Internet.

COIN 420 may utilize shared security standards such as authentication tokens. The cloud exchange provider or a third-party identity management provider may manage the tokens to ensure the security of data transfers within COIN 420. Each customer may first purchase a port to cloud exchange point 303 and may then be configured with a virtual connection to COIN 420.

The connections within customers in COIN 420 may not be a buy-sell relationship. Instead, by providing routing information 414, each customer may connect with each other customer in COIN 420. Customers may use these connections to exchange data, for example. For example, a single cross-connect and a single interface for each customer may allow all customers in COIN 420 to exchange routes and traffic with one another via VRF 402C.

In some examples, programmable network platform (PNP) 120 for the cloud exchange point 303 may configure one or more VRFs 402 in the cloud exchange network infrastructure to establish an Internet Protocol-Virtual Private Network (IP-VPN) for exchanging routes among the various COIN 420 participant networks and forwarding packets among the COIN 420 participant networks attached to the IP-VPN according to the routes. The PNP 120 may offer a COIN administration interface 422 by which a COIN administrator 424, such as the cloud exchange provider or any of the COIN participants, may add or remove COIN 420 participants and request that the PNP 120 configure the IP-VPN for the COIN 420 in order to provide interconnectivity in accordance with COIN participation.

Once a COIN participant network, such as customer 308D, has a cross-connect to a cloud exchange point 303 port, PNP 120 may configure a virtual circuit 412A for customer 308D to VRF 402C for COIN 420. PE 310D may then peer with PE 304C to send, via virtual circuit 412A, routing information 414A to PE 304C indicating reachability to the customer 308D. Furthermore, PE 310D may receive routing information from PE 304C that is stored to VRF 402C and received from other COIN participants. PE 310D may subsequently forward network packets to any of the other COIN participants to VRF 402C, based on the received routing information. As such, each of the COIN 420 participants need not have a direct, "buy-sell," relationship. Instead, each COIN 420 participant has interconnectivity to each other COIN 420 by virtue of the COIN 420. The cloud exchange provider may bill the interconnectivity provided for the COIN 420 to each of the COIN 420 participants individually.

PNP 120 may manage the authentication scheme for accessing COIN 420. Any COIN 420 participant may connect using authentication/authorization tokens for the cloud exchange. PNP 120 may include a trusted identity manager for the authentication scheme.

In some examples, cloud exchange point 303 may apply network address translation (NAT) for each of the plurality of COIN 420 participants to enable customer networks with overlapping address spaces to communicate using an IP-VPN established within cloud exchange point 303 for a community of interest.

For instance, NAT service 430 may be associated with respective customer VRFs for the plurality of COIN participants (separate VRFs not shown in FIG. 5), with the plurality of customer VRFs each configured by programmable network platform 120 to advertise routes to an egress VRF of the NAT service 430 and to receive routes from an ingress VRF of the NAT service 430. As a result, NAT service 430 attracts service traffic associated with each of the customer networks and that is to have NAT services applied. The ingress and egress VRFs of the NAT service may constitute part of a service chain for service traffic between any pair of the COIN participants.

In some examples, PE 302C distributes, for customer VRFs, customer routes received via peering sessions to the NAT service 430, which dynamically maps the customer route prefixes to cloud exchange point route prefixes drawn from an address pool established by programmable network platform 120 for the community of interest. The customer routes are installed to the ingress VRF for NAT service 430. The NAT service 430 installs the mappings to a set of address mappings. The NAT service 430 also installs, to the egress VRF for NAT service 430, cloud exchange routes that specify the cloud exchange route prefixes and NAT service 430 as the next hop. In this way, NAT service 430, and more specifically the egress VRF of the NAT service 430, attracts service traffic from each of the COIN participants that is intended for any of the other COIN participants but is destined for the cloud exchange routes installed to the egress VRF for NAT service 430. The ingress and egress VRFs of NAT service 430 may be configured with route targets so as to cause the ingress and egress VRFs to leak routes to one another via iBGP, for instance. Routes exchanged via peering sessions between customer VRFs and NAT service 430 may include labeled routes for implementing MPLS/BGP IP-VPNs according to RFC 4364, incorporated above.

Cloud exchange point 303 may forward and apply NAT service 430 to service traffic from PE 310A, intended for customer network 308E, as follows. PE 304C receives a service packet on an attachment circuit with PE 310D. The packet has a destination address that is a cloud exchange point 303 address drawn from the NAT service address pool. The customer VRF associated with the attachment circuit with PE 310D stores a route for the destination address that specifies an address for the NAT service 430 device, and the PE that implements the customer VRF tunnels the packet using to the NAT service 430 device for application of the NAT service. NAT service 430 uses the address mappings dynamically provisioned for routes for customer network 308E to perform NAT and replace the service packet destination address with a destination address in customer network 308E. The NAT service 430 device may determine in the ingress VRF for the NAT service 430 the labeled route to the PE with the customer VRF (the label identifying a customer VRF for customer 308E) and tunnel the modified service packet to the PE, which may identify the customer VRF for customer 308E from the label attached to the modified service packet. The PE forwards the modified service packet to PE 310E via an attachment circuit with PE 310E. In this way, cloud exchange point 303 provides a NAT service to all COIN traffic to enable different networks having overlapping address space to communicate in a full mesh using cloud exchange point 303.

In some examples, a member of a community of interest may submit, using the COIN administration interface 422, one or more prefixes of its customer network for use by the NAT service 430. The programmable network platform 120 may pre-configure mappings in NAT service 430 of the one or more prefixes of the customer network to corresponding cloud exchange route prefixes. In this way, the customer may cause NAT services to be applied to service traffic from other members of the community of interest based on the mapped cloud exchange route prefixes and forwarded to the customer network for the customer.

Figure 6:
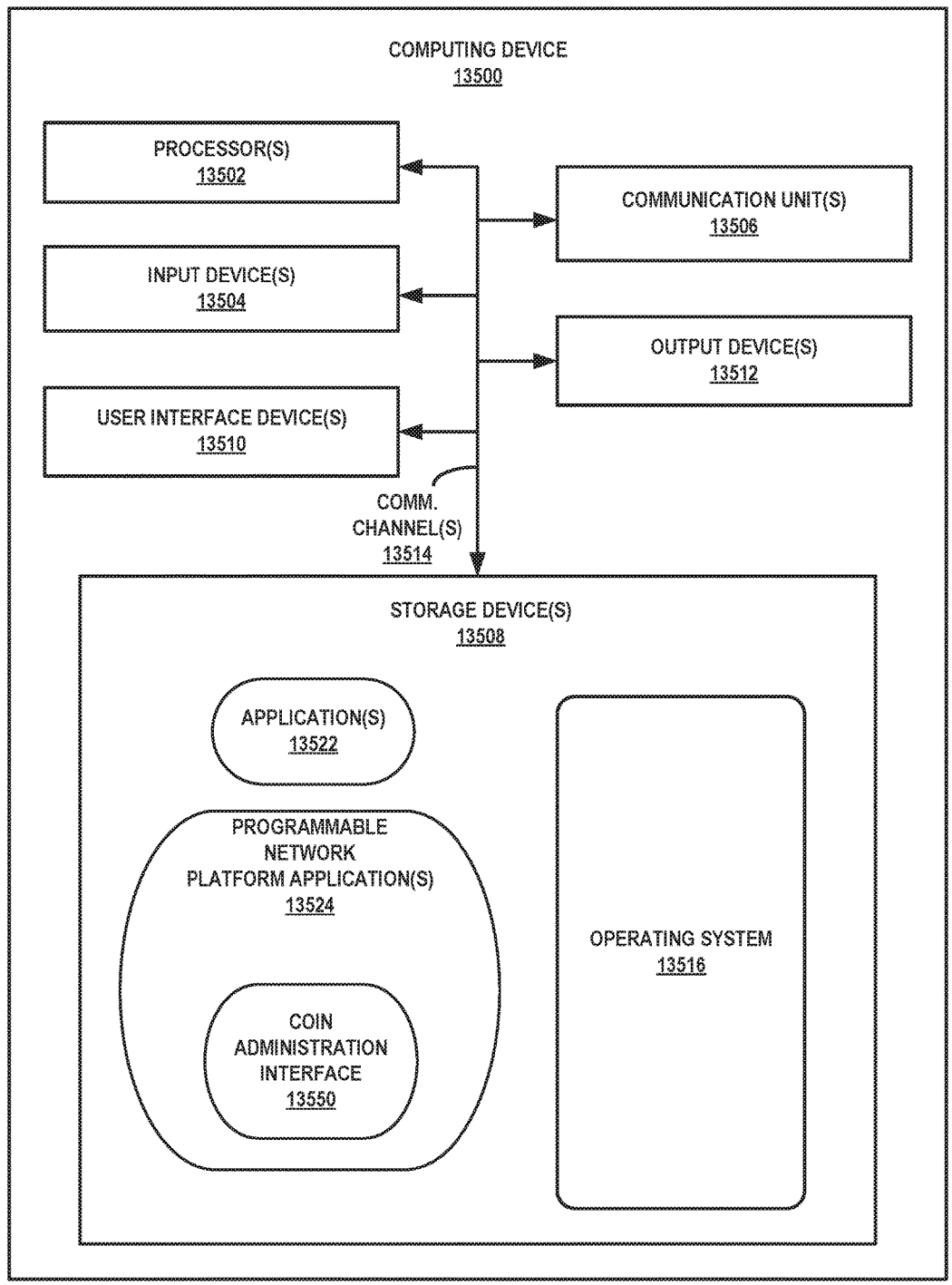
FIG. 6 is a block diagram illustrating further details of one example of a computing device that operates in accordance with one or more techniques of the present disclosure.

FIG. 6 is a block diagram illustrating further details of one example of a computing device that operates in accordance with one or more techniques of the present disclosure. FIG. 6 may illustrate a particular example of a server or other computing device 13500 that includes one or more processor (s) 13502 for executing any one or more of the programmable network platform components, or any other system, application, or module described herein. Other examples of computing device 13500 may be used in other instances. Although shown in FIG. 6 as a stand-alone computing device 13500 for purposes of example, a computing device may be any component or system that includes one or more processors or other suitable computing environment for executing software instructions and, for example, need not necessarily include one or more elements shown in FIG. 6 (e.g., communication units 13506; and in some examples components such as storage device(s) 13508 may not be co-located or in the same chassis as other components).

As shown in the specific example of FIG. 6, computing device 13500 includes one or more processors 13502, one or more input devices 13504, one or more communication units 13506, one or more output devices 13512, one or more storage devices 13508, and user interface (UI) device 13510, and communication unit 13506. Computing device 13500, in one example, further includes one or more applications 13522, programmable network platform application(s) 13524, and operating system 13516 that are executable by computing device 13500. Each of components 13502, 13504, 13506, 13508, 13510, and 13512 are coupled (physically, communicatively, and/or operatively) for inter-component communications. In some examples, communication channels 13514 may include a system bus, a network connection, an inter-process communication data structure, or any other method for communicating data. As one example, components 13502, 13504, 13506, 13508, 13510, and 13512 may be coupled by one or more communication channels 13514.

Processors 13502, in one example, are configured to implement functionality and/or process instructions for execution within computing device 13500. For example, processors 13502 may be capable of processing instructions stored in storage device 13508. Examples of processors 13502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 13508 may be configured to store information within computing device 13500 during operation. Storage device 13508, in some examples, is described as a computer-readable storage medium. In some examples, storage device 13508 is a temporary memory, meaning that a primary purpose of storage device 13508 is not long-term storage. Storage device 13508, in some examples, is described as a volatile memory, meaning that storage device 13508 does not maintain stored contents when the computer is turned off. Examples of volatile memories include random access memories (RAM), dynamic random access memories (DRAM), static random access memories (SRAM), and other forms of volatile memories known in the art. In some examples, storage device 13508 is used to store program instructions for execution by processors 13502. Storage device 13508, in one example, is used by software or applications running on computing device 13500 to temporarily store information during program execution.

Storage devices 13508, in some examples, also include one or more computer-readable storage media. Storage devices 13508 may be configured to store larger amounts of information than volatile memory. Storage devices 13508 may further be configured for long-term storage of information. In some examples, storage devices 13508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 13500, in some examples, also includes one or more communication units 13506. Computing device 13500, in one example, utilizes communication units 13506 to communicate with external devices via one or more networks, such as one or more wired/wireless/mobile networks. Communication units 13506 may include a network interface card, such as an Ethernet card, an optical transceiver, a radio frequency transceiver, or any other type of device that can send and receive information. In some examples, computing device 13500 uses communication unit 13506 to communicate with an external device.

Computing device 13500, in one example, also includes one or more user interface devices 13510. User interface devices 13510, in some examples, are configured to receive input from a user through tactile, audio, or video feedback. Examples of user interface devices(s) 13510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 13512 may also be included in computing device 13500. Output device 13512, in some examples, is configured to provide output to a user using tactile, audio, or video stimuli. Output device 13512, in one example, includes a presence-sensitive display, a sound card, a video graphics adapter card, or any other type of device for converting a signal into an appropriate form understandable to humans or machines. Additional examples of output device 13512 include a speaker, a cathode ray tube (CRT) monitor, a liquid crystal display (LCD), or any other type of device that can generate intelligible output to a user.

Computing device 13500 may include operating system 13516. Operating system 13516, in some examples, controls the operation of components of computing device 13500. For example, operating system 13516, in one example, facilitates the communication of one or more applications 13522 and programmable network platform application(s) 13524 with processors 13502, communication unit 13506, storage device 13508, input device 13504, user interface devices 13510, and output device 13512.

Application 13522 and programmable network platform application(s) 13524 may also include program instructions and/or data that are executable by computing device 13500. Example programmable network platform application(s) 13524 executable by computing device 13500 may include COIN administration interface 13550, which is illustrated with dashed lines to indicate that COIN administration interface 13550 may or may not be executable by any given example of computing device 13500.

In some examples, PNP 13524 may manage the authentication scheme for accessing a COIN. Any COIN participant may connect using authentication/authorization tokens for the cloud exchange. PNP 13524 may include a trusted identity manager for the authentication scheme, such as the cloud exchange provider or a third-party identity management provider.

COIN administration interface 13550 may include instructions for causing computing device 13500 to perform one or more of the operations and actions described in the present disclosure with respect to COIN administration. As one example, COIN administration interface 13550 may include instructions that cause computing device 13500 to, based on commands from a COIN administrator, add or remove COIN participants. A COIN administrator may request that PNP 13524 configure the IP-VPN for the COIN to provide interconnectivity in accordance with COIN participation. In some examples, the COIN administrator may be the cloud exchange provider or any of the COIN participants.

Figure 7:
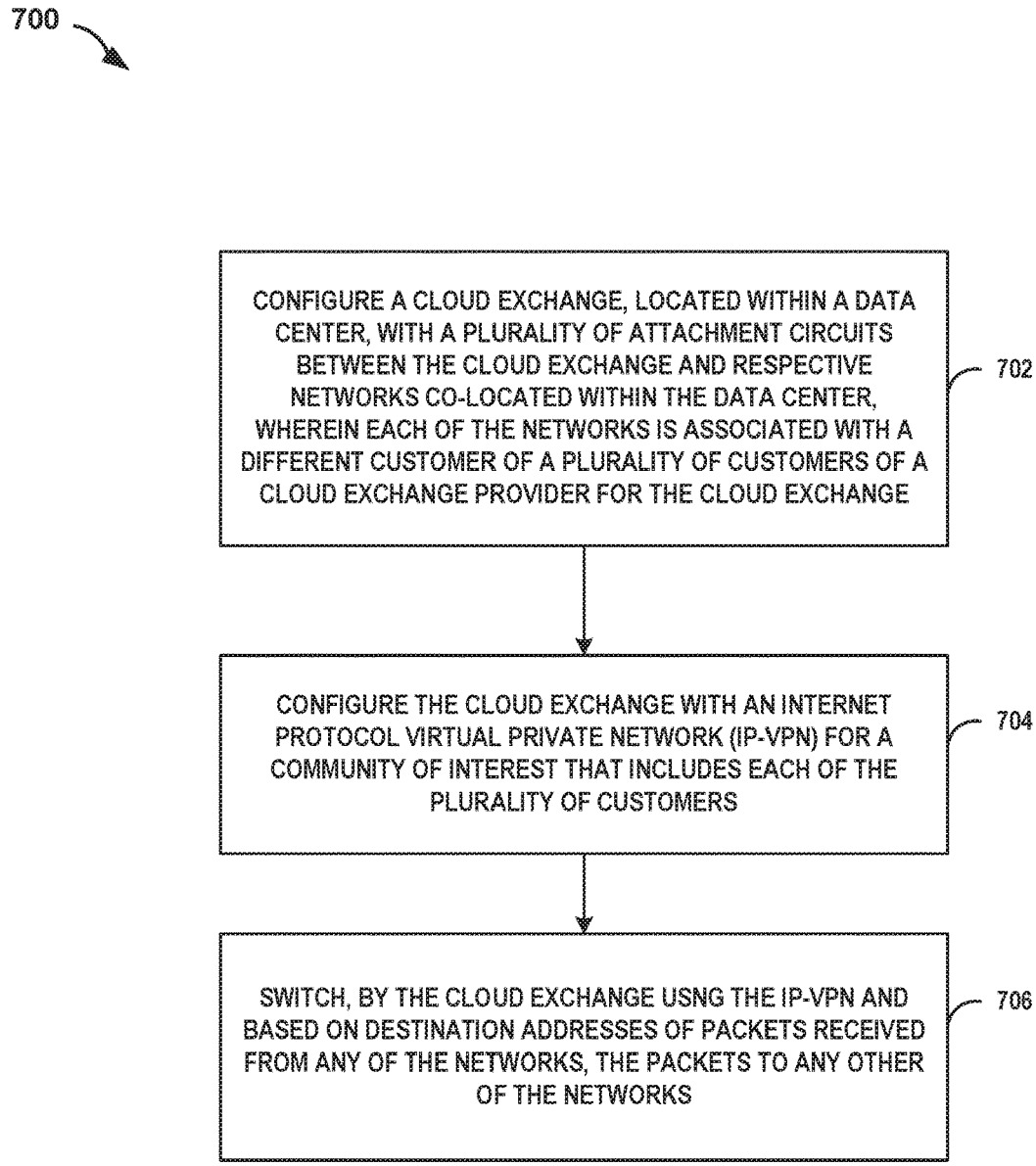
FIG. 7 is a flow diagram illustrating an example mode of operation for a cloud exchange, in accordance with techniques of the disclosure.

FIG. 7 is a flow diagram illustrating an example mode of operation for a cloud exchange, in accordance with techniques of the disclosure. Operation 700 in FIG. 7 is described for purposes of example with respect to programmable network platform 120 and cloud exchange point 303 of FIG. 5. In some examples, process 700 may be performed by other components, such as PNP 13524 in FIG. 6. Programmable network platform 120 may configure a cloud exchange, located within a data center, with a plurality of attachment circuits between the cloud exchange and respective networks co-located within the data center (702). Each of the networks co-located within the data center may be associated with a different customer of a plurality of customers of a cloud exchange provider for the cloud exchange.

Programmable network platform 120 may further configure the cloud exchange with an IP-VPN for a community of interest that includes each of the plurality of customers (704). In some examples, the COIN may include private connections between the respective networks and the cloud exchange, rather than private connections directly from network to network.

The cloud exchange network infrastructure may switch, using the IP-VPN and based on destination addresses of packets received from any of the networks, the packets to any other of the networks (706).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:
1. A method comprising:
configuring, by a programmable network platform for a cloud exchange deployed by a cloud exchange provider and located within a data center, the cloud exchange with a plurality of attachment circuits between the cloud exchange and respective networks co-located within the data center, wherein the cloud exchange provider administers the programmable network platform, and wherein each of the networks is associated with and deployed by a different customer of a plurality of customers of the cloud exchange provider for the cloud exchange;

configuring, by the programmable network platform, the cloud exchange with an Internet Protocol Virtual Private Network (IP-VPN) for a community of interest having participants that include each of the plurality of customers;

receiving, by the programmable network platform, a request to add a new customer of the cloud exchange provider as a participant in the community of interest, wherein the new customer is associated with a new network deployed by the new customer, wherein the new network is co-located within the data center;

configuring, by the programmable network platform in response to the request, the IP-VPN for the community of interest to include an interface for an attachment circuit for the new network associated with the new customer, wherein the IP-VPN for the community of interest offers a full mesh of private interconnections among the networks and the new network that are associated with participants in the community of interest; and switching, by the cloud exchange using the IP-VPN and based on destination addresses of packets received from any of the networks or the new network, the packets to any other of the networks or the new network.

2. The method of claim 1, wherein the cloud exchange comprises a layer 3 (L3) autonomous system, and wherein configuring the cloud exchange comprises configuring, by the programmable network platform, the L3 autonomous system.

3. The method of claim 1, wherein the IP-VPN comprises a shared routing instance.

4. The method of claim 1, wherein the IP-VPN comprises at least one virtual routing and forwarding instance configured with interfaces for the plurality of attachment circuits.

5. The method of claim 1, wherein the programmable network platform is configured for execution by one or more management devices within the data center and presents a community of interest administration interface for configuring the cloud exchange with the IP-VPN for the community of interest.

6. The method of claim 1, wherein the cloud exchange does not advertise routes for the plurality of networks to the Internet.

7. The method of claim 1, further comprising:

configuring, by the programmable network platform, a network address translation service with an address pool of a plurality of cloud exchange route prefixes;

receiving, by the network translation service from a first network of the networks, a route to a network address prefix for the first network, the route being advertised to the IP-VPN;

storing, by the network translation service, a mapping of the network address prefix for the first network to a cloud exchange route prefix from the address pool;

advertising, by the network translation service to each other network of the networks not including the first network, a route to the cloud exchange route prefix from the address pool specifying the network address translation service as a next hop for the cloud exchange route prefix; and receiving, by the network address translation service from one of the other networks of the networks not including the first network, the packets, wherein the packets are destined for a network address in the cloud exchange route prefix from the address pool, wherein switching the packets to any other of the networks comprises applying, by the network address translation service based on the mapping, network address translation to modify the service traffic to be destined for an address in the network address prefix for the first network and outputting the packets to the first network.

8. The method of claim 1, wherein the plurality of customers comprises three or more customers.

9. A cloud exchange deployed by a cloud exchange provider, the cloud exchange comprising:

a programmable network platform for the cloud exchange, wherein the cloud exchange provider administers the programmable network platform;

a layer three (L3) autonomous system located within a data center, wherein the L3 autonomous system is configured with a plurality of attachment circuits between the cloud exchange and respective networks co-located within the data center, wherein each of the networks is associated with and deployed by a different customer of a plurality of customers of a cloud exchange provider for the cloud exchange, and wherein the L3 autonomous system is configured with an Internet Protocol Virtual Private Network (IP-VPN) for a community of interest having participants that include each of the plurality of customers, wherein the programmable network platform is configured to a request to add a new customer of the cloud exchange provider as a participant in the community of interest, wherein the new customer is associated with a new network deployed by the new customer, wherein the new network is co-located within the data center, wherein the programmable network platform is configured to configure, in response to the request, the IP-VPN for the community of interest to include an interface for an attachment circuit for the new network associated with the new customer, wherein the IP-VPN for the community of interest offers a full mesh of private interconnections among the networks and the new network that are associated with participants in the community of interest, and wherein the L3 autonomous system is configured to switch, using the IP-VPN and based on destination addresses of packets received from any of the networks or the new network, the packets to any other of the networks or the new network.

10. The cloud exchange of claim 9, wherein the IP-VPN comprises a shared routing instance.

11. The cloud exchange of claim 9, wherein the IP-VPN comprises at least one virtual routing and forwarding instance configured with interfaces for the plurality of attachment circuits.

12. The cloud exchange of claim 9, wherein the L3 autonomous system is configured with the IP-VPN by a programmable network platform.

13. The cloud exchange of claim 9, wherein the programmable network platform is configured for execution by one or more management devices within the data center to present a community of interest administration interface for configuring the community of interest.

14. A system comprising:
a plurality of networks associated with and deployed by respective customers of a cloud exchange provider, the plurality of networks co-located in a data center;
a cloud exchange of the data center deployed by the cloud exchange provider;
a programmable network platform administered by the cloud exchange provider and configured to:
configure the cloud exchange, located within the data center, with respective attachment circuits between the cloud exchange and the networks; and
configure the cloud exchange with an Internet Protocol Virtual Private Network (IP-VPN) for a community of interest having participants that include each of the plurality of customers,
receive a request to add a new customer of the cloud exchange provider as a participant in the community of interest, wherein the new customer is associated with a new network deployed by the new customer, wherein the new network is co-located within the data center;
configure, in response to the request, the IP-VPN for the community of interest to include an interface for an attachment circuit for the new network associated with the new customer, wherein the IP-VPN for the community of interest offers a full mesh of private interconnections among the networks and the new network that are associated with participants in the community of interest
wherein the cloud exchange is configured to switch, using the IP-VPN and based on destination addresses of packets received from any of the networks or the new network, the packets to any other of the networks or the new network.

15. The system of claim 14,
wherein the cloud exchange comprises a layer 3 (L3) autonomous system, and
wherein the programmable network platform is further configured to configure the L3 autonomous system.

16. The system of claim 14, wherein the IP-VPN comprises a shared routing instance.

17. The system of claim 14, wherein the IP-VPN comprises at least one virtual routing and forwarding instance configured with interfaces for the plurality of attachment circuits.

18. The system of claim 14, wherein the programmable network platform is further configured to present a community of interest administration interface for configuring the community of interest.

19. The system of claim 14, wherein the cloud exchange does not advertise routes for the plurality of networks to the Internet.

* * * * *